Sept. 5, 1939.  F. P. WALLACE  2,171,676
FLY AND BAIT KIT
Filed March 8, 1937
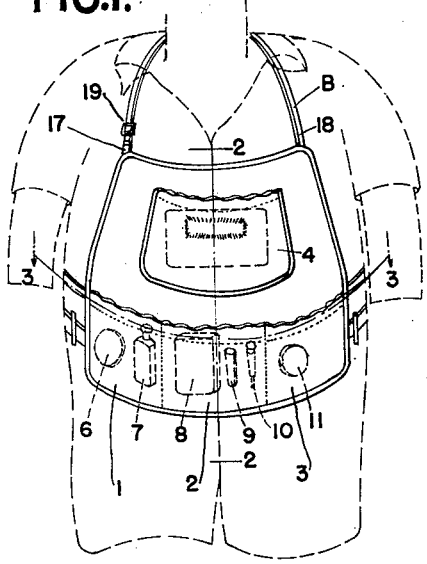
FIG.I.
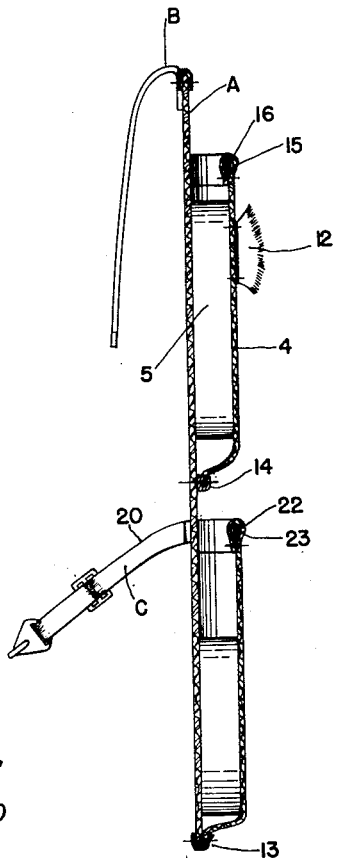
FIG. 2.
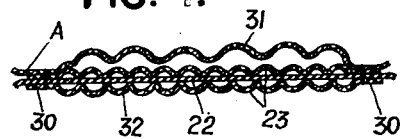
FIG. 4.
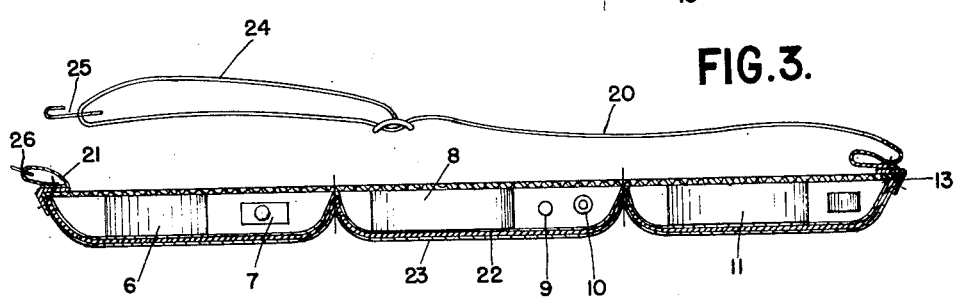
FIG. 3.
FIG. 5.
*INVENTOR*
FORREST. P. WALLACE.
BY *Whittemore, Hulbert & Belknap*
ATTORNEYS Patented Sept. 5, 1939

2,171,676

UNITED STATES PATENT OFFICE 2,171,676

FLY AND BAIT KIT

Forrest P. Wallace, Detroit, Mich.

Application March 8, 1937, Serial No. 129,757

3 Claims. (Cl. 224—5)

This invention relates generally to fly and bait kits and refers more particularly to the type that may be worn upon the person.

One of the essential objects of the invention is to provide an outfit of this type that is adapted to fit persons of different sizes and that can be worn by the user without inconvenience or interference with the free use of the arms and hands, and in such a manner as to permit easy access to all portions of the kit while fishing.

Another object is to provide a fly and bait kit having spacious flexible pockets for holding the equipment desired for fishing, such as a tackle box, line dressing, fly dressing, medical kit, hook hone, screw driver, leader box and the like. In the past some kits have had tackle boxes as a fixed part thereof and this necessitated the transfer from separate tackle boxes to the tackle box of the kit of the tackle desired for fishing. Usually each angler has his own tackle box and desires to keep it intact and to have it along and handy while fishing. In the present instance the angler does not have to use a box of a kit for his tackle. Instead he may use his own tackle box, and such box may be carried loose in one of the pockets of the kit so as to be readily accessible.

Another object is to provide a kit that may be readily suspended and belted to the person and that is provided with suitable straps and belts for this purpose. There are no buttons to fumble with.

Another object is to provide a kit wherein the belt is elastic and passes through the kit in such a way that it will hold the kit tight against the person at the same time and will tend to close the adjacent pockets, for example, when bending over, so that articles carried thereby will be effectively prevented from falling out.

Another object is to provide the kit with a patch of sheep's wool for holding flies for drying purposes. Heretofore such patches were worn upon hats or caps and therefore were remote to the other equipment being carried. In the present instance, however, everything is self-contained in my kit. In other words, I have provided a carry-all for all necessary equipment.

Other objects, advantages and novel details of construction of this invention will be made more apparent as this description proceeds, especially when considered in connection with the accompanying drawing, wherein:

Figure 1 is a front elevation of a kit embodying my invention and showing by dotted lines its application to the body of a person;

Figure 2 is a vertical sectional view taken substantially on the line 2—2 of Figure 1;

Figure 3 is a cross sectional view taken substantially on the line 3—3 of Figure 1.

Figures 4 and 5 are diagrammatic views illustrating the relationship of parts under different conditions.

Referring now to the drawing, A is the body portion and B and C, respectively, are the neck band and belt of a kit embodying my invention. As shown, the body portion A is in the form of an apron and is provided upon its front face with a plurality of pockets 1, 2, 3 and 4, respectively. Preferably the pocket 4 is at the center adjacent the top of the apron and is adapted to receive a tackle or fly box 5, while the pockets 1, 2 and 3, respectively, are side by side along the bottom of the apron and are adapted to receive other fishing equipment such as a box 6 containing line dressing, a box 7 containing fly dressing, a medical kit 8, a hook hone 9, a screw driver 10, a leader box 11, etc. Upon the outer side of the upper pocket 4 is a patch 12 of sheep's wool for receiving flies for drying purposes.

Preferably the apron is provided around the edges thereof with suitable binding 13. Likewise, the upper pocket 4 is provided along the bottom and side edges thereof with binding 14. At its upper edge, the pocket 4 has a hem 15 containing an elastic band 16 which gathers the material of the pocket as shown and serves to substantially close the pocket when the kit is worn upon the person. The neck band B is preferably in two sections 17 and 18, respectively, of non-elastic material. The section 17 is relatively short and is fastened to the apron A at its upper edge adjacent one side thereof, while the section 18 is relatively long and is fastened to the apron A at its upper edge adjacent the other side thereof. Preferably the short section 17 is provided at its free end with a buckle 19 or other fastener for receiving and holding the long section 18.

The belt C comprises an elastic strip 20 and a tab 21. Preferably a portion 22 of the elastic strip is contained in a hem 23 at the upper edges of the pockets 1, 2 and 3, while the main portion 20 of said strip projects from one side edge of the apron and is free to pass around the waist of a person. The lines of stitching, which divide pocket 2 from pockets 1 and 3, attach the elastic strip to the apron and to the upper corners of said pockets, as shown in Fig. 1. As shown, this portion 20 is fastened by suitable stitching to the adjacent side of the apron and is provided at its free end with an adjustable loop 24 containing a hook 25. The tab 21 is fastened to the apron in line with the elastic strip 20 at the other side edge of the apron and is provided at its free end with an eye 26 for receiving the hook 25. Thus, with this construction the elastic strip 20 will not only hold the apron firmly against the body of the wearer, but will also hold the pockets 1, 2 and 3 substantially closed against the apron when the kit is being worn so that articles therein will be effectively prevented from falling out.

As seen in Fig. 3, the pockets 1, 2 and 3 are of a size to provide fullness when extended. The elastic band 22, as mentioned above, is stitched to the apron at the margins of the pockets. The elastic band 22 is of a length to be substantially extended when the apron is tensioned, as is apparent from Fig. 1. In other words, the elastic band 22 intermediate the top corners of the individual pockets is of a length less than the spacing of said corners on the apron and is, of course, substantially less than the length of the top of the pocket.

In Figs. 4 and 5 I have illustrated more or less diagrammatically the operation of the improved arrangement.

In Fig. 4 all of the parts are in untensioned condition. The elastic band 22 is at its normal length, and the apron A is slack or has fullness intermediate the corners 30 of the pocket, as indicated at 31. The hem 23 of the pocket being of a size to provide fullness, is even slacker or has more fullness than the apron between the corners 30, 30, as indicated at 32.

In Fig. 5 I have illustrated the condition when the apron is tensioned to take up the slack 31. The elastic band 22 is stretched, and as will be evident, will tend to retain the hem 23 against the apron A. Further extension of the elastic band is possible and is permitted by the slack still present in the hem 23 when the apron A is fully extended.

In use the kit may be worn upon a person as illustrated in Figure 1. In this position the neck band B encircles the neck of the person, while the belt encircles the waist. All the articles in the pockets are readily accessible, and the arms and hands of the wearer are entirely free.

What I claim as my invention is:

1. In an article of apparel, a patch pocket of a size to provide fullness secured thereto, elastic means carried by the top of said patch pocket and secured to said article at the top corners of said pocket, said elastic means being of a length such that when in unstretched condition the article intermediate said corners is slack, and means securing said article to the body of the wearer for tensioning said article in line with the top of said pocket to take up said slack and to partially extend said elastic means, whereby the top of said pocket is resiliently retained against said tensioned article.

2. An apron, a patch pocket of a size to provide fullness secured thereto, an elastic band carried by the top of said pocket and secured to said apron at the top corners of said pocket, said band intermediate said corners being of less length when unstretched than the spacing of said corners on said apron, and a belt secured to said apron in line with the top of said pocket for tensioning said apron to partially extend said elastic band.

3. An apron, a patch pocket of a size to provide fullness secured thereto, an elastic band carried by the top of said pocket and secured to said apron at the top corners of said pocket, said band intermediate said corners being normally of less length than the spacing of said corners on said apron, and a belt secured to said apron in line with the top of said pocket for tensioning said apron to partially extend said elastic band, said belt comprising a continuation of said elastic band and being secured to said apron at the edges thereof.

FORREST P. WALLACE.